United States Patent [19]
Tupper et al.

[11] Patent Number: 5,906,224
[45] Date of Patent: *May 25, 1999

[54] RESERVE FUEL VALVE AND METHOD FOR MAKING

[75] Inventors: Willis E. Tupper, Pinckney; Donald Koengeter, Chelsea, both of Mich.

[73] Assignee: Dapco Industries, Dexter, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/636,204

[22] Filed: Apr. 22, 1996

[51] Int. Cl.⁶ .................................................. F16K 11/087
[52] U.S. Cl. ...................... 137/625.47; 137/835; 251/152
[58] Field of Search ....................... 137/625.47; 280/835; 123/510; 251/152, 309

[56] References Cited

U.S. PATENT DOCUMENTS

| | | | |
|---|---|---|---|
| 4,458,878 | 7/1984 | Tsuno | 251/152 |
| 4,572,239 | 2/1986 | Koch et al. | 137/625.47 |
| 5,115,837 | 5/1992 | Tupper | 137/625.41 |

*Primary Examiner*—John Fox
*Attorney, Agent, or Firm*—Young & Basile, P.C.

[57] ABSTRACT

An improved, panel-mounted fuel reserve valve for a recreational vehicle fuel system. The valve body is molded plastic with a cruciform-symmetrical arrangement of throughbores defining the fuel inlets, the fuel outlet and a valve bore for receiving an internal valve assembly. In the illustrated embodiment the fuel inlets are coaxial, the fuel outlet and the valve bore are coaxial, and the internal valve assembly includes a ball valve element which mates with O-ring type seals associated with the fuel inlets. In a preferred form the valve includes molded hose connectors inserted in the fuel inlets, the hose connectors having valve seat portions which define retainers for the O-rings to hold them firmly and precisely against the ball valve element in the valve body. The invention is also a method for achieving the inventive valve body structure with little or no "flash" or injection leakage which would affect the valve sealing tolerances inside the valve body.

6 Claims, 4 Drawing Sheets

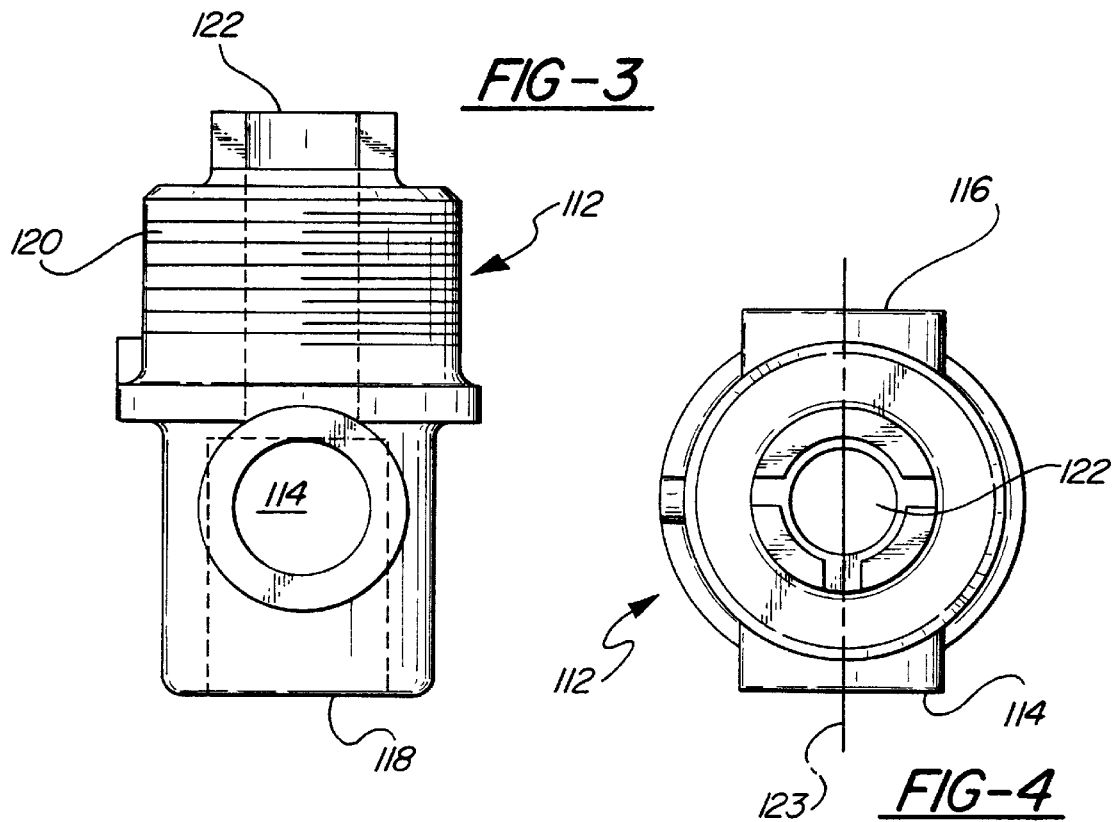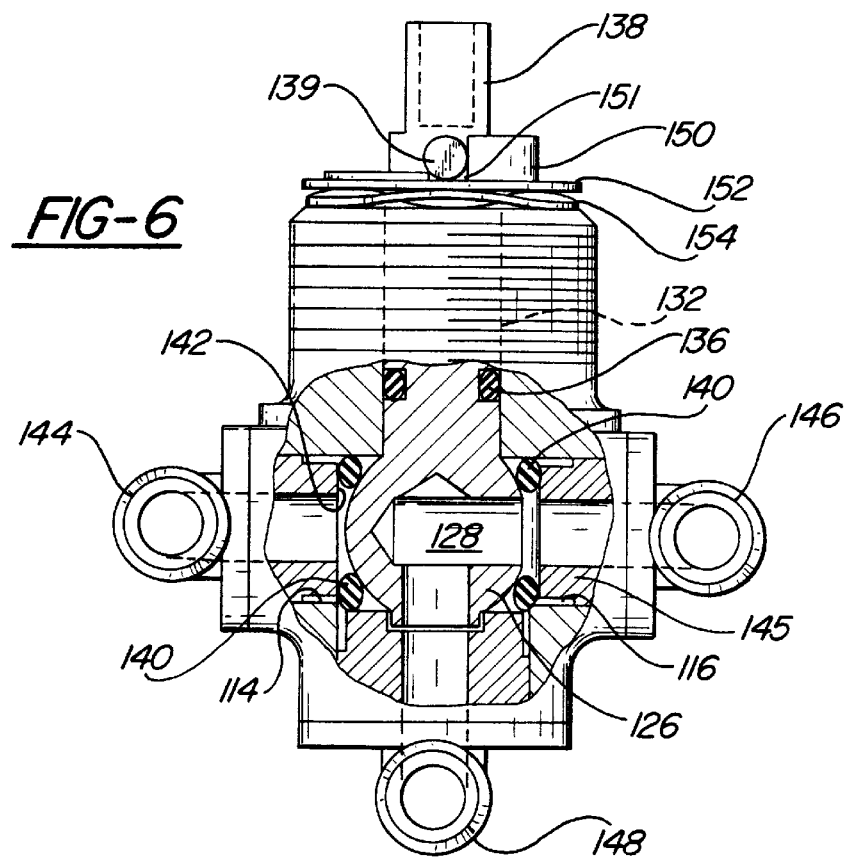

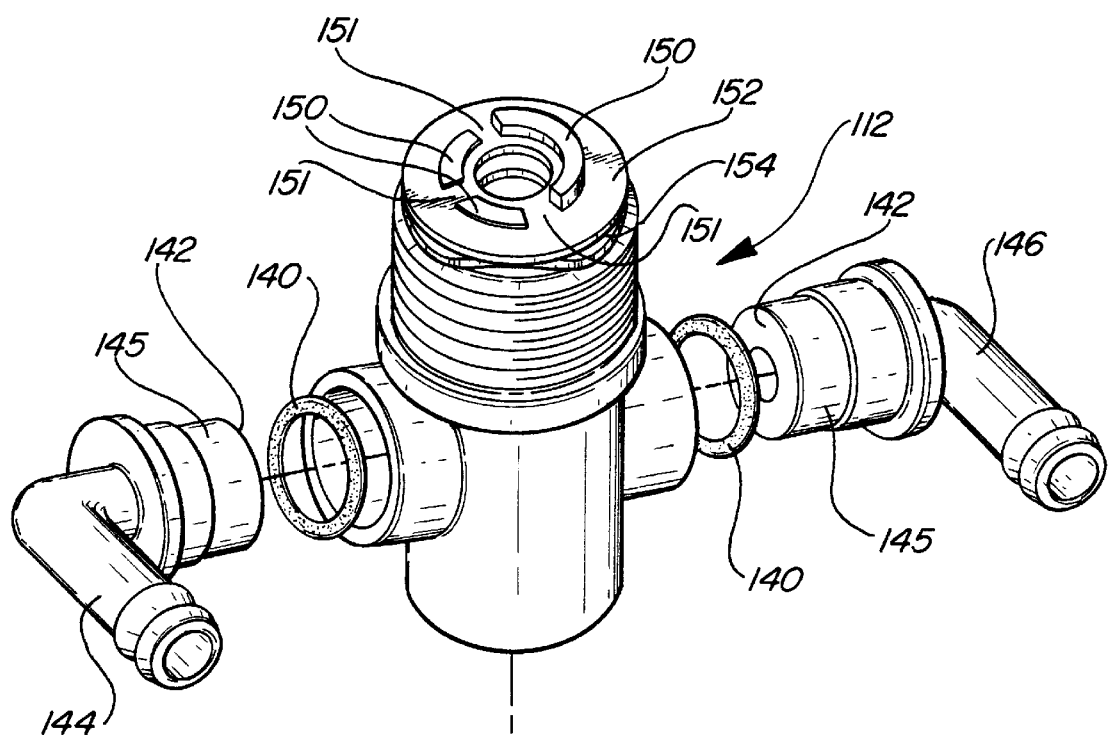
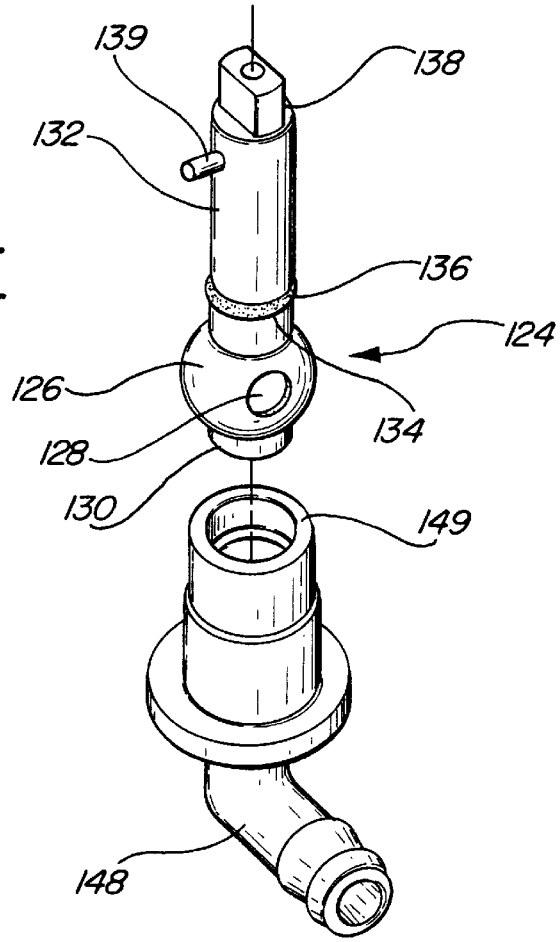
FIG-5

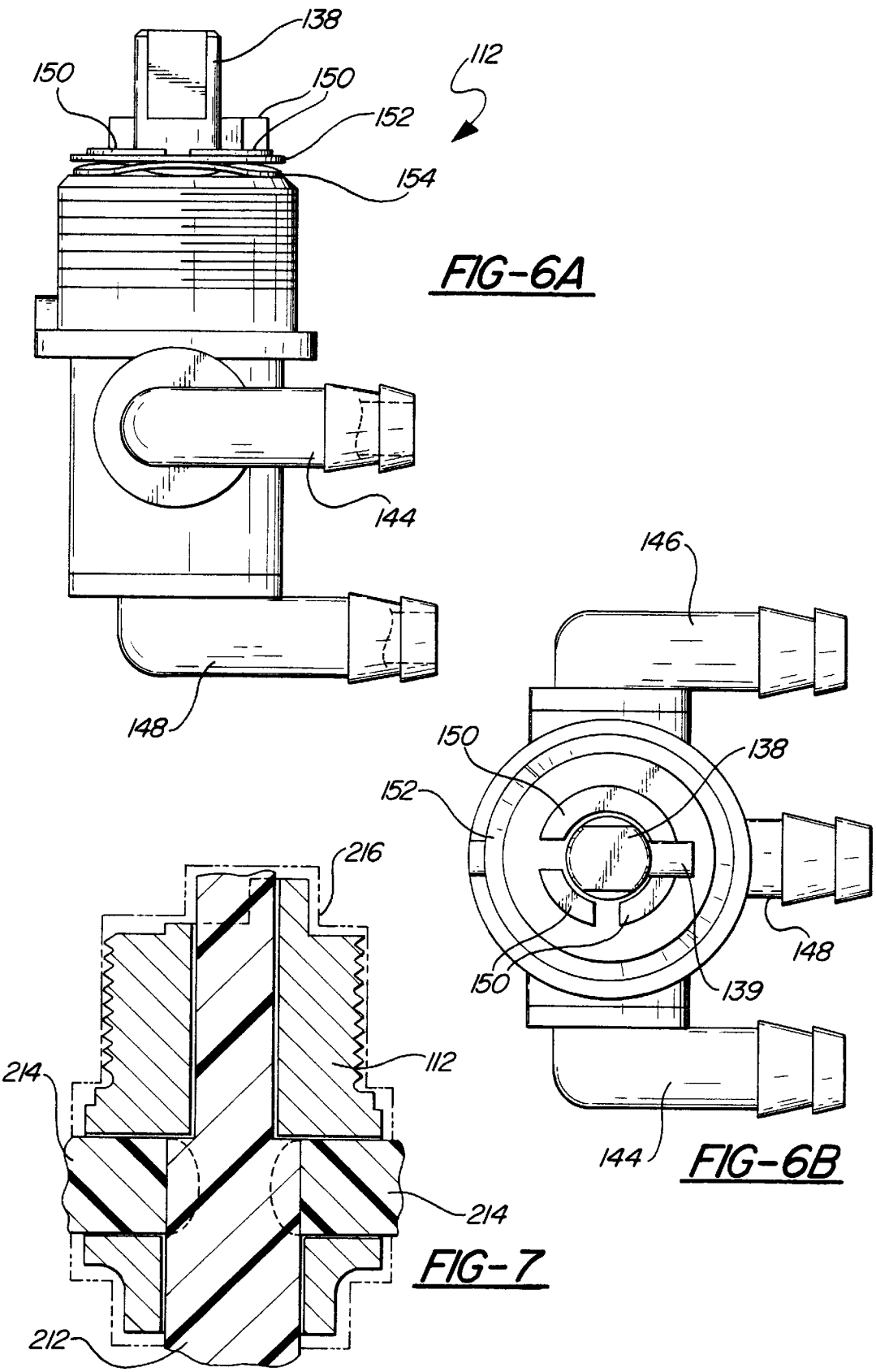

5,906,224

RESERVE FUEL VALVE AND METHOD FOR MAKING

FIELD OF THE INVENTION

The present invention is related to reserve fuel selector valves of the type commonly used on jet skis, snowmobiles, off-road vehicles (ORVs), and other recreational vehicles.

BACKGROUND OF THE INVENTION

Recreational boats, jet skis, ORVs, snowmobiles and the like typically have fuel systems which are accessible to the operator. Access and operator control over the fuel system typically extends to an on/off fuel reserve valve with a two-or three-position switch operating between "on" (main fuel tank feed), "reserve" (reserve fuel tank feed), and shutoff positions. These valves have a main fuel inlet, a reserve fuel inlet and a fuel outlet. An internal valve assembly is operated by an external handle or switch to selectively open and close flow from the fuel inlets to the fuel outlet. Known types of internal valve assemblies include rotary discs, tapered or sleeve-type valve bodies, and multi-position ball valves.

One type of prior art fuel reserve valve is disclosed in U.S. Pat. No. 5,115,837 issued May 26, 1992 and co-owned with the present application. This prior art valve is an undertank-mounted valve with fuel inlet ports on the side mounted to the tank, and an outlet port to the engine on the opposite side of the valve. The valve uses a ball-type valve element. The valve is somewhat difficult to manufacture, as it requires a large number of intersecting core pins in the mold to form the various inlets, outlets and internal chambers. This results in an increase in "flash" (plastic leaking around the mating faces of the core pins) due to insufficient, uneven mating pressure on the core pins.

There is sometimes a need to mount a fuel reserve valve on a control panel of the vehicle, rather than under the fuel tank. Such valves typically have a threaded portion or coupling which is screwed into a mating threaded hole in a panel. This mounting arrangement dictates a different valve geometry than that used in undertank-mounted valves of the type in U.S. Pat. No. 5,115,837; i.e., all of the fuel inlet and outlet connectors must be located on one side of the valve so that hose connections can be made on the same side of the panel. A prior art panel-mounted valve is shown in FIG. 1, comprising a die cast metal body with main and reserve fuel inlets and a fuel outlet all formed on the front face of the valve below a threaded panel mounting plug. The valve of FIG. 1 uses a sleeve-and-plug type internal valve assembly.

There are a number of problems inherent in the prior art valve design of FIG. 1. The valve body is die cast and generally of low quality in terms of tolerances, especially sealing tolerances; the sleeve-type seal has a large sealing area which quickly becomes gritty, hard to turn, and prone to failure in actual use; and the valve is relatively expensive. Additionally, the fuel inlet and outlet arrangement limits the flexibility of connections with the fuel tank and the engine.

The present invention overcomes the problems associated with the prior art valve of FIG. 1 by providing an inexpensive, reliable, panel-mounted fuel reserve valve with superior sealing and improved connection options.

SUMMARY OF THE INVENTION

In its broadest form the invention is an improved fuel reserve valve for panel-mounted use in a vehicle fuel system, comprising a symmetrical molded plastic body having a panel-mounting portion with a valve bore, a main fuel inlet, a reserve fuel inlet, and a fuel outlet. An internal ball valve assembly is operated by external switch or handle means to alternately open and close fuel flow between the main fuel inlet and the outlet, and between the reserve fuel inlet and the outlet. The plastic valve body is cruciform symmetrical, with the valve bore and the fuel outlet being coaxial along a first longitudinal valve axis, and the main and reserve fuel inlets being coaxial along a second transverse valve axis perpendicular to the first valve axis.

The ball valve assembly has a sliding seal fit with O-ring sealed valve seats formed in the valve body by O-ring retainers inserted in the fuel inlets when the valve is assembled. The retainers form precise valve seats for the O-rings to maintain the O-ring seals under constant pressure and in precise alignment with the ball valve.

In yet a further form of the inventive fuel reserve valve, the fuel inlets and outlet are provided with hose connectors which form the O-ring retainers when inserted in the valve body. The hose connectors, which may be straight or elbow-type, have a cylindrical base or plug precisely molded to form the corresponding valve seat. The hose connectors are secured in the valve body by ultrasonic welding, spin welding, or other suitable fluidtight methods known to those skilled in the art.

The invention is also a method for forming a fuel reserve valve of the type having a valve body with a main fuel inlet, a reserve fuel inlet, an outlet, and a valve assembly in the valve body for selectively opening and closing flow between the inlets and the outlet. A plastic valve body is molded around a longitudinal main core pin defining the fuel outlet and valve bore, and two opposed, coaxial inlet core pins abutting the main core pin in perpendicular fashion to define opposed, coaxial fuel inlets perpendicular to the outlet. The forces of the inlet core pins are symmetrically balanced on the main core pin to reduce flash and form precise inlet/outlet dimensions in the plastic valve body associated with valve seats.

In a further form of the method invention the valve seats are formed by cylindrical retainers subsequently inserted in the inlets of the valve body to hold O-ring seals in constant pressure and position against an internal ball valve assembly. In the preferred form the retainers are the base portions of hose connectors assembled to the plastic valve body by inserting them in the inlets and the outlet.

These and other features and advantages of the invention will become apparent upon further reading of the specification.

BRIEF DESCRIPTION OF THE DRAWINGS

FIG. 3 is an elevational right side view of the valve body of FIG. 2 (the left side view being substantially identical);

FIG. 4 is a plan view of the valve body of FIG. 2;

FIG. 5 is an exploded perspective view of a valve according to the present invention, including internal valve and seal components and external hose connectors;

FIG. 6 is an elevational front view of the valve of FIG. 5 when fully assembled, partially cut away to show the interior valve assembly and fluid paths;

FIGS. 6A and 6B are left side elevational and plan views, respectively, of FIG. 6; and, FIG. 7 illustrates the method of molding the valve body of FIG. 2 around a balanced set of mold core pins.

DETAILED DESCRIPTION OF THE DRAWINGS

Figure 1:
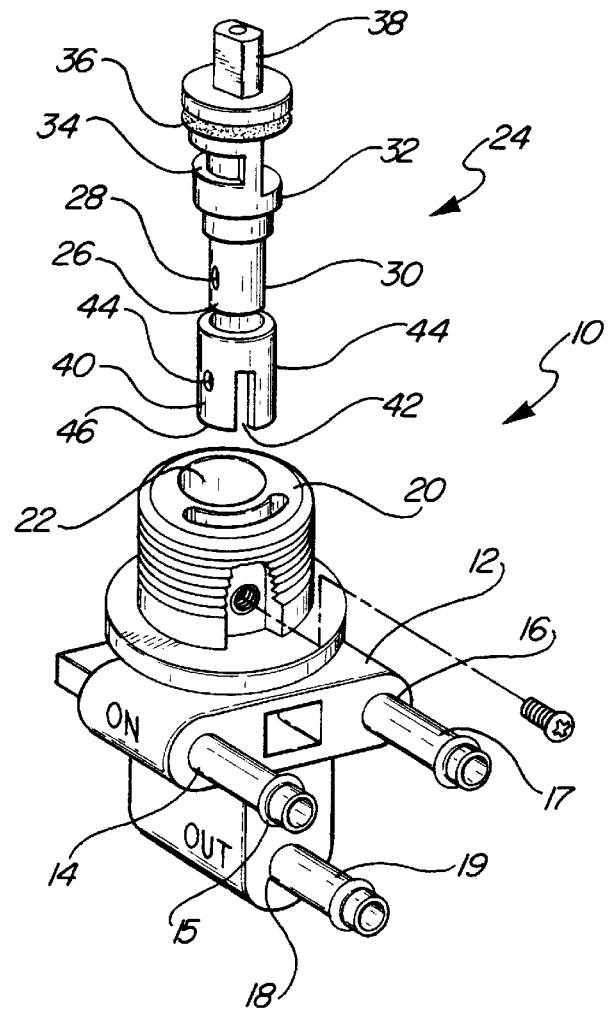
FIG. 1 is an exploded perspective view of a prior art panel-mounted reserve fuel valve with a plug-type valve member.

Referring first to FIG. 1, the prior art die cast reserve fuel valve briefly described above is shown in detail. Prior art valve 10 has a die cast aluminum valve body 12, with a main fuel inlet 14 having a brass connector 15 for attachment to a hose (not shown) from the fuel tank; a reserve fuel inlet 16 with a connector 17 for a reserve hose from the reserve fuel supply; and, a fuel outlet 18 with a connector 19 for a fuel line hose to the engine. Prior art valve 10 is designed to be screw-mounted into a mating panel or console on the vehicle, via threaded panel mount plug 20. A cylindrical bore 22 is formed through panel mount plug 20 into the interior of valve body 12 to receive the internal valve assembly 24.

Valve assembly 24 is a plug-and-sleeve type having a plug valve element 26 with inlet and outlet flow ports 28, 30 located to communicate with the main and fuel reserve inlets and fuel outlet. Valve assembly 24 further includes a stem 32 with a locking groove 34, an O-ring stem seal 36, and an operating handle portion 38 which protrudes from panel mount 20 to operate the valve.

Plug valve element 26 is surrounded by a sleeve type seal 40 which is rotationally locked inside the valve body by longitudinal mounting slots 42 which engage appropriate lugs (not shown) in bore 22. Sleeve seal 40 includes a pair of opposed inlet flow openings 44 aligned with the main and reserve fuel inlet openings in the interior of the valve body, and is open at its lower end 46 to communicate with an outlet flow opening in the valve body. The interior surface of sleeve seal 40 mates in a sliding friction fit with valve plug element 26 to form a seal therebetween.

Valve assembly 24 can be rotated to selectively align inlet flow port 28 with one of the inlet flow openings 44 in seal 40, thereby permitting flow from either the main or reserve fuel inlets through seal 40 and valve element 26 to the fuel outlet and the fuel tank.

Some of the disadvantages of the die cast prior art valve 10 include high cost; low-quality tolerances inherent in the die casting process; and the large sealing surface area between valve plug element 26 and sleeve seal 40, which is prone to becoming gritty, being hard to turn and failing in actual use. Additionally, the forward-facing arrangement of all three inlets/outlets limits the number of hose connection options, and requires careful rotational alignment of the valve when installing it in the panel.

Figure 2:
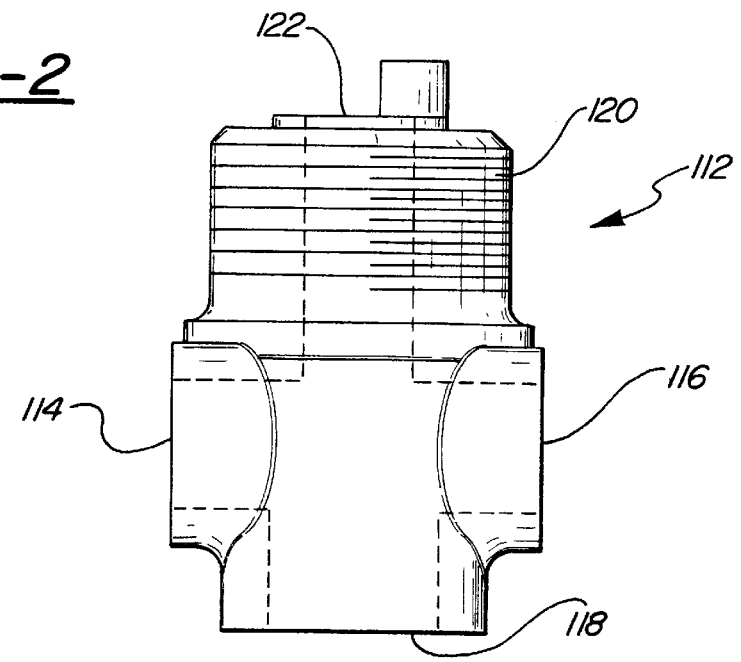
FIG. 2 is an elevational front view of an improved panel-mounted reserve fuel valve body according to the present invention.

Referring now to FIGS. 2–4, an inventive valve body 112 for use in a fuel reserve valve (FIG. 5) is illustrated in different views. Valve body 112 is integrally molded from a suitable plastic material, for example in the illustrated embodiment a glass-filled nylon. It will be apparent to those skilled in the art that various "plastics" (e.g., thermo-setting polymers) may be suitable for the inventive valve body, depending on the intended application. Factors which may affect material selection include fuel and temperature resistance, creep, moldability, permeability, cost, strength, and others known to those skilled in the art.

Molded plastic valve body 112 is essentially symmetrical, with a main fuel inlet 114 on a first side, a reserve fuel inlet 116 on the opposite side, a fuel outlet 118 to the engine on the lower end, and threaded panel mount plug 120 with a valve stem bore 122 on the upper end. As shown in FIGS. 2–4, main and reserve fuel inlets 114, 116 are coaxial and 180° opposed, while fuel outlet 118 is perpendicular to inlets 114, 116. Valve stem bore 122 is coaxial with fuel outlet 118. Valve body 112 accordingly has a cruciform arrangement of intersecting throughbores defining the fuel inlets, the fuel outlet and the valve bore. It is therefore cruciform symmetrical, at least as to the inlets, the outlet and the value bore along the line of symmetry illustrated at 123 in FIG. 4.

The symmetrical nature of valve body 112 allows it to be molded in a manner ensuring precise tolerances for valve seats, which is critical for proper sealing and operation of the valve as further described below. This symmetry also increases hose connection options, and reduces the criticality of valve body alignment upon installation.

Referring now to FIG. 5, an entire illustrative valve 110 according to the present invention, including all internal and external components associated with valve body 112, is shown in an exploded perspective view for ease of explanation. In addition to molded plastic valve body 112 as described above, valve 110 further includes a ball valve assembly 124 comprising a ball valve element 126 with flow ports 128, 130; a valve stem 132 with an O-ring mounting groove 134 for an O-ring seal 136; an exterior handle portion 138 which can be manipulated by the vehicle operator to switch the valve between main, reserve and fuel shutoff positions; and a detent pin 139. In the illustrated embodiment, ball valve assembly 124 is integrally machined from brass and nickel-plated for corrosion resistance. The ball valve assembly is precision machined and polished to provide close tolerances with sealing surfaces in the valve body, and to insure smooth, reliable sliding contact with the seals without damaging them.

Referring now to FIGS. 5 and 6 simultaneously, O-ring seals 140 are mounted on valve seats 142 in the valve body to be in sealing contact with ball valve element 126 located in the chamber defined by the intersecting throughbores in the valve body. O-ring seals 140 prevent fuel from leaking around ball valve element 126 from a fuel inlet. The ball valve element 126 has a sliding seal fit with O-ring seals 140. The spherical surface of ball valve element 126 and its smooth finish result in minimal contact with the O-ring seals on the valve seats, thereby eliminating the sealing problems associated with the prior art sleeve-type seal arrangement of FIG. 1.

However, because the O-ring/ball valve sealing contact area is smaller, it is important to maintain the O-ring seals under constant pressure and in precise alignment with the ball valve element 126 to prevent leakage and provide crisp, reliable flow control as the ball valve element rotates in its sliding seal fit on O-ring seals 140.

It is difficult to cast, mold or weld a suitably precise valve seat or pocket for the O-ring seals in the interior of the valve body, despite the improvement in precision molding effected by the novel core pin arrangement and cruciform valve body 112. One prior technique for seating O-rings against a ball valve element has been used in connection with the valve of U.S. Pat. No. 5,115,837, involving a cylindrical brass retainer inserted into the inlet/outlet to seat the O-ring in a suitably precise manner. The present invention provides an improved arrangement in which the molded plastic hose connectors 144, 146 include an extended retainer portion 145 at their base which, when inserted into an inlet, forms a precise valve seat 142 for the O-ring seal. Combined with the precise valve body inlet/outlet bore dimensions achieved with the new cruciform-symmetrical molding method, the ball valve element is assured of a positive, precise, even seal with all of the associated O-rings.

In the illustrated embodiment the end 149 of fuel outlet hose connector 148 forms a direct seating surface for ball valve element 126. The seal between the fuel outlet and the ball valve is generally not as critical as that with the fuel inlet.

Once inserted into the appropriate inlet/outlet bore, the hose connectors 144, 146, 148 are secured directly to the valve body by ultrasonic welding, spin-welding, or other suitable methods. In the illustrated embodiment the connectors are ultrasonically welded to the valve body 112, since this method allows the greatest control over the position of the O-ring retainer portions 145 and their valve seats 142.

The symmetrical, 90° offset of the fuel inlets and outlet allow for an increased number of hose connection options. In the illustrated embodiment the connectors are angled elbows, all facing forwardly in the same direction. However, the configuration of the valve can be changed to match individual hose requirements simply by installing various combinations of straight and angled connectors.

Also shown in FIG. 6 is a detent mechanism on the upper end of threaded panel-mount plug 120 to lock the ball valve element 126 in each of its on, reserve and shutoff positions. The detent mechanism includes a number of multi-height detent tabs 150 molded into the upper face of plug 120, with gaps 151 between them sized to receive a selector pin 139 on handle portion 138 of the valve assembly. A detent plate 152 and underlying wave washer 154 provide spring tension to pin 139 as it is rotated between the three valve positions, locking it firmly in place in each position to prevent accidental movement.

Referring now to FIG. 7, the valve body 112 of FIG. 2 is shown as it is formed around a series of injection-mold core pins 212, 214 in a mold schematically represented at 216. Valve body 112 is injection molded around a single, longitudinal main core pin 212 and two transverse core pins 214 whose end faces abuttingly mate with main core pin 212. This symmetrical cruciform arrangement of mold core pins, in particular the use of a single main core pin on which the forces of all other core pins are evenly balanced, virtually eliminates the problem of "flash" described above. It is also results in a simpler and less expensive mold. The valve body 112 produced with this method can be formed with very precise tolerances in the longitudinal and transverse throughbores which define the valve inlets and outlets, ensuring a precise sealing fit between the ball valve element and the retainers and seals assembled therewith.

It is to be understood that the foregoing is an illustrative embodiment of the invention, and is not intended to be limiting beyond the scope of the appended claims. Accordingly, we claim:

1. An improved three-position fuel reserve valve adapted for panel-mounted use in a recreational vehicle fuel system, comprising:

a molded plastic body having a panel-mounting portion, a valve bore, a main fuel inlet, a reserve fuel inlet, and a fuel outlet, wherein the valve bore, the fuel inlets and the fuel outlet are cruciform symmetrical and intersect at a valve chamber in the valve body, the fuel inlets comprising a continuous axial bore of constant diameter through the molded plastic body;

an internal ball valve assembly in the valve bore with a ball valve element positioned in the valve chamber to selectively seal the fuel inlets from the outlet;

an O-ring sealed valve seat at the intersection of each fuel inlet with the valve chamber, each O-ring sealed valve seat comprising a cylindrical base portion of a hose connector inserted into each fuel inlet, and an O-ring seal on the cylindrical base portion in sealing contact with the ball valve element and the fuel inlet bore, such that the ball valve element is in sliding sealing contact with the O-ring seals in the fuel inlets.

2. The valve of claim 1, wherein the hose connectors extend at an angle from the fuel inlets.

3. The valve of claim 1, wherein the valve bore is formed through the panel-mounting portion of the valve body.

4. The valve of claim 3, wherein the panel-mounting portion is a cylindrical threaded plug.

5. The valve of claim 1, wherein the fuel outlet is coaxial with the valve bore, the fuel outlet having a diameter greater than the diameter of the valve bore, the fuel outlet further including a valve seat at the intersection of the fuel outlet with the valve chamber, the valve seat comprising a base portion of a hose connector inserted in the fuel outlet.

6. The valve of claim 1, wherein the hose connectors are formed from a plastic material which is weld-compatible with the molded plastic body, and the hose connectors are welded in their respective fuel inlets and the fuel outlet.

\* \* \* \* \*

UNITED STATES PATENT AND TRADEMARK OFFICE
CERTIFICATE OF CORRECTION

PATENT NO. : 5,906,224
DATED : May 25, 1999
INVENTOR(S) : Tupper

It is certified that error appears in the above-indentified patent and that said Letters Patent is hereby corrected as shown below:

In the Title, after "valve" delete "and method for making";

Column 4, line 9, after "nature of" insert --intersecting throughbores in the--.

Signed and Sealed this

Fifth Day of October, 1999

Attest:

Q. TODD DICKINSON

*Attesting Officer*   *Acting Commissioner of Patents and Trademarks*